United States Patent

[11] 3,624,685

| [72] | Inventor | Clarence O. Babcock<br>Denver, Colo. |
| [21] | Appl. No. | 885,514 |
| [22] | Filed | Dec. 16, 1969 |
| [45] | Patented | Nov. 30, 1971 |
| [73] | Assignee | The United States of America as represented by the Secretary of the Interior |

[54] MECHANICAL STRAIN OR DISPLACEMENT GAGE
10 Claims, 10 Drawing Figs.

| [52] | U.S. Cl. | 33/174, 33/148 D |
| [51] | Int. Cl. | G01b 5/30 |
| [50] | Field of Search | 33/174 R, 174 L, 147 D, 148 D |

[56] References Cited
UNITED STATES PATENTS
2,335,889  12/1943  Maris ............ 33/147 D Primary Examiner—Leonard Forman
Assistant Examiner—Paul G. Foldes
Attorneys—Ernest S. Cohen and M. Howard Silverstein ABSTRACT: A displacement gage having three contact legs one leg of which is movable in all strain directions by being attached to a ball and socket joint while each of the other legs is immovable in the direction of said one leg but is movable normal to this direction. A mirror is attached to the ball and socket to translate movement of said one leg to a readout device. The two displacement directions are at right angles to one another to simultaneously provide Poisson's ratio and the modulus of elasticity.

PATENTED NOV 30 1971 3,624,685
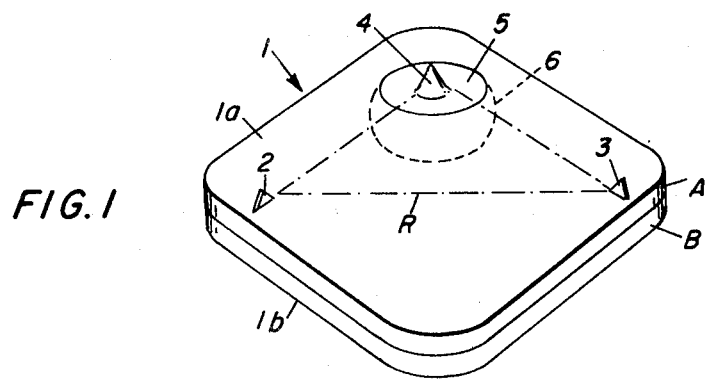
FIG.1
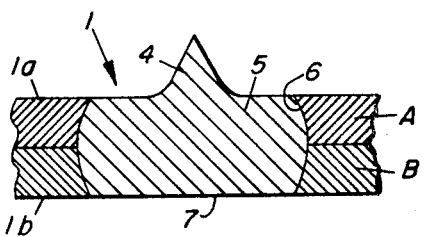
FIG. 2
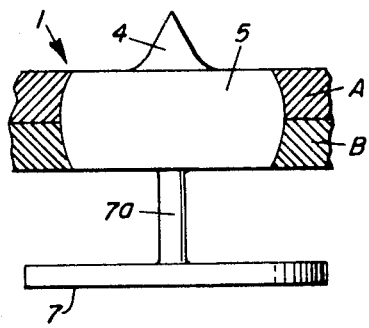
FIG. 2a
FIG.3
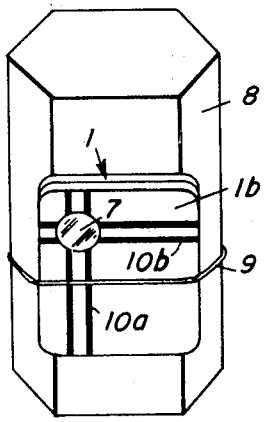
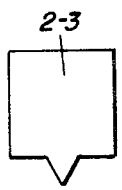
FIG.4a
FIG.4b
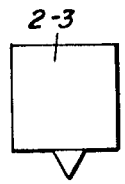
FIG.4c
FIG.4d
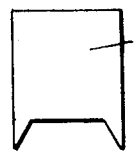
FIG.4e
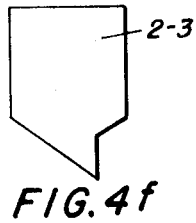
FIG.4f
INVENTOR
CLARENCE O. BABCOCK
BY *Ernest S. Cohen*
*M. Howard Silverstein*
ATTORNEYS

MECHANICAL STRAIN OR DISPLACEMENT GAGE

This invention relates to mechanical strain gages also known as displacement gages.

Prior art gages of this type generally include two contact legs depending from the base of the gage. One leg is immovable, the other movable (usually pivotally) along the imaginary line between their points of contact on the surface of the object being studied. Movement of the movable leg as a result of a strain on the object being stress studied is translated to a readout instrument. For any known stress, the modulus of elasticity is thereby calculated or the instrument is graduated to give the modulus relative to the known stress.

In order to determine Poisson's ratio (the ratio of the normal lateral strain to the normal axial strain) of the test object, two such prior art gages are required so that the legs of one gage are aligned along the normal axial strain, and the legs of the other are aligned along the normal lateral strain. There has been some work on development of a gage which, when employed singularly, can determine both the modulus of elasticity and Poisson's ratio, but such gages heretofore developed require subsequent prolonged calculations to ultimately determine both these physical properties.

I have now developed a novel strain or displacement gage which, when employed singularly, will readily determine both the modulus of elasticity and Poisson's ratio. Basically, the gage includes three contact legs, instead of the usually two, depending from the base of the gage body. The imaginary lines between the contact points of the legs define a right triangle. Two of the legs are thereby located at the vertices of the acute angles of the triangle, while the third leg is located at the 90° angle. Each leg at an acute angle is immovable in the direction of the 90° leg, but is movable normal to this direction. The 90° leg is movable in any strain direction by being rotatably mounted in a joint such as a spherical socket in the body of the gage. Movement of the 90° leg is then translated in a prior art manner to a readout instrument. Most effective translation is provided by rotatably mounting a mirror on the same joint, and determining the mirror-reflected displacement of an appropriate chart as observed through a reticle of a telescope, or by determining the reflected displacement of a collimated light beam on a chart.

Since the gage need not be limited to simultaneously measuring Poisson's ratio and the modulus of elasticity, the two displacement directions need not be at right angles to one another, and the three legs can define other triangles besides a right triangle.

It is therefore an object of the present invention to provide a strain gage which is capable, as a single unit, of simultaneously determining displacement in two directions.

Another object is to provide a strain gage which is capable, as a single unit, of determining both the modulus of elasticity and Poisson's ratio.

A further object is to provide a mirror on such a displacement gage to translate the resultant of displacement in two directions to a readout instrument.

Other objects and advantages will be obvious from the following more detailed description of the invention taken in conjunction with the drawings in which:

FIG. 1 is a perspective view of the gage;
FIG. 2 is a fragmentary view of a cross section of FIG. 1;
FIG. 2a is an alternative embodiment of FIG. 2;
FIG. 3 is a view of the gage secured to a test object; and
FIGS. 4a–4f are alternative embodiments of component 2 or 3 of FIG. 1.

In the drawings, the device will be described with reference to the use of a mirror as the mechanism for translating leg displacement to readout, although other prior art translating mechanisms such as fulcrums and levers or twisting metal strips could be adapted for use in the gage. Further, the gage will be described with regard to use in uniaxial testing of specimens in tension or compression, although, as previously stated, its use is not limited thereto.

Referring to FIG. 1, numeral 1 designates the gage body 1 generally consisting of attached sections A and B which can be fabricated from metal. In this view is shown the surface 1a of the gage which faces the test object during employment in the requisite manner. Projecting therefrom are three contact legs 2, 3 and 4. The imaginary lines between the contact points of these legs define a right triangle R.

Legs 2 and 3 are of the same type and are integral with body 1 or set into slots therein. Setscrews (not shown) can be employed to secure these legs in their respective slots. Leg 4 is integral with or otherwise rigidly connected to member 5 in body 1.

Leg 2, located at one of the acute angles of right triangle R, is positioned so that it is immovable along the imaginary line between legs 2 and 4, but is movable, flex-or-pivot-wise, normal to this line. Likewise, leg 3, located at the other acute angle, is positioned so that it is immovable along the line between legs 3 and 4, but movable normal to this direction.

Referring to FIG. 2, therein is shown, in cross section, member 5 which effects movement of leg 4 in any normal strain direction. It can be seen that member 5 is in the shape of a partial sphere or ball set for rotation in socket or bearing surface 6. At the surface 1b of body 1, which surface faces away from the test object, is a mirror 7 which is integral with or otherwise rigidly mounted on spherical member 5.

As shown in FIG. 2a, the mirror 7, instead of being an integral part of member 5, can be connected to member 5 by a rod 7a. This arrangement provides for greater movement of the mirror per unit movement of leg 4, and thereby results in greater magnification of the leg movement.

In practice when the gage is secured to the test object, a block can be placed on the surface 1b (which faces away from the test object) to keep member 5 from rotating and thus ensure initial proper gage lengths between legs 2 and 4 and legs 3 and 4. The legs are, of course, placed on the test object so that the two displacement directions are in the direction of axial and lateral strain.

Referring to FIG. 3, the gage body 1 is secured to the test object 8 by, for example, rubber bands 9. Other mechanisms such as tension springs or clamps can also be employed. Sets of parallel lines 10a and 10b marked on the gage at surface 1b enable a telescope (not shown) to be focused on the center of mirror 7 by lining up each of the crosshairs of the scope between a set of parallel lines 10a and 10b. The telescope is angularly displaced from the normal to the center of the mirror, which enables an appropriate chart to be reflected by the mirror and viewed through the scope. Prior to placing stress on the test object 8, the chart is positioned so that its vertical and horizontal centerlines coincide with the crosshairs on the telescope.

When the test object 8 is put under a predetermined stress, leg 4 moves as a result of the strain on the test object and thereby displaces mirror 7. Since each leg 2 and 3 is immovable in the direction of leg 4, but is free to move at right angles to that direction, resultant displacement between the three points of support is provided by movement of leg 4. Movement of mirror 7 displaces the center of the chart from the center of the crosshairs of the telescope.

Upon displacement, if the chart is of the simple square grid variety, the $x$ and $y$ distance (as read on the chart) of the center of the scope's crosshairs from the center of the chart is noted, and Poisson's ratio is then simply determined from the ratio of these values. For greater convenience, the chart may have slope lines appropriately graduated to show the slope of each line so that Poisson's ratio can be read directly therefrom.

As to the modulus of elasticity, it can be shown mathematically that the magnification factor with regard to displacement of leg 4 on the surface of test object 8 is equal to $$\frac{2 \times \text{distance between chart and center of ball}}{\text{Distance between the center of the ball and test object}}$$

From this formula, the actual $y$ displacement of leg 4 can readily be determined, and the modulus calculated from the known stress, or the chart units can be graduated to give the modulus relative to a particular stress and a predetermined distance between chart and mirror.

Any convenient distance, e.g., 4 or 5 feet, of the telescope from the mirror can be chosen since this distance does not enter the magnification relationship.

Rather than a telescope, a collimated light beam produced optically or by a small laser can be reflected onto the chart by the mirror. Poisson's ratio and the modulus of elasticity are then readily determined by the displacement of the small circle of light on the chart. Employing such a light source rather than the telescope allows a reduction in the size of ball-shaped member 5 with a corresponding increase in the instrument's magnification. Such a light also makes it easier to align the instrument.

It will be obvious to those skilled in the art that many mechanical variations can be employed in the manufacture of the present gage. For example, the body 1 can be fabricated from a single piece of metal, or a plurality of pieces screwed or otherwise secured together. Surface 1a adjacent the test object can be concave so as to avoid contact with the test object. Legs 3 and 4 can be designed in many ways. For example, the front and side view of two configurations is shown in FIGS. 4a–b and 4c–d, respectively. The side view of two other leg designs is shown in FIGS. 4e and 4f. Ball 5 can be fabricated so that it does not contact bearing surface 6 in more than three small areas adjacent to the mirror, the areas being 120° apart. Dissimilar metals can be used to manufacture ball 5 and bearing surface 6 to reduce friction and increase accuracy. Bearing surface 6 may be hardened by carburizing or other processes to reduce wear and friction. Mirror surface 7 need not be flush with body surface 1b. Surface 1b need not be flat and could include a reinforcing ridge around the mirror hole to make bearing surface 6 more rigid and less deformable by bearing pressures. Bearing surface may be impregnated with a lubricant or contain lubricating grooves. Further, the gage may be vibrated in the direction of a bisector of the 90° angle of triangle R by a vibrator of prior art design mounted on body surface 1b, to eliminate the frictional forces between ball and seat that would bias the gage reading. Surface 1b preferably should be nonreflecting black or other color to avoid downgrading the image produced by the mirror.

What is claimed is:

1. A displacement gage for measuring tension or compression strain on a surface of a test object comprising a gage body; first, second and third legs projecting out of one surface of said body the extremities of which legs contact said surface of said test object when said gage is measuring said strain; said first leg, when in contact with said test object surface under said strain, being immovable, relative to said gage body, in the direction of the line between said extremities of said first and third legs, but being movable in a direction normal thereto, said movement being substantially within the imaginary plane formed by the lines between said extremities of said three legs; said second leg, when in contact with said test object surface under said strain, being immovable, relative to said gage body, in the direction of the line between said extremities of said second and third legs, but being movable in a direction normal thereto, said movement being substantially within said imaginary plane; said third leg being connected to pivot means in said gage which provides movement of said third leg, relative to said gage body, in any direction substantially within said imaginary plane when said third leg is in contact with said test object surface under said strain; and means to translate said movement of said third leg to readout means.

2. The gage of claim 1 wherein the line between said first and third legs is at right angles to the line between said second and third legs.

3. The gage of claim 2 wherein said pivot means comprises a member which is at least partially spherically shaped and which is rotatably set in a socket and wherein said third leg is connected to said member.

4. The gage of claim 2 wherein said translation means comprises a mirror connected to said pivot means which mirror moves as said third leg moves.

5. The apparatus of claim 3 wherein said translation means comprises a mirror connected to said member.

6. The apparatus of claim 4 wherein said mirror is integral with said pivot means.

7. The apparatus of claim 5 wherein said mirror is integral with said member.

8. The apparatus of claim 4 wherein said movement of said first and second legs is provided by flexing movement of said legs.

9. The apparatus of claim 6 wherein said movement of said first and second legs is provided by flexing movement of said legs.

10. The apparatus of claim 7 wherein said movement of said first and second legs is provided by flexing movement of said legs.

* * * * *